(12) United States Patent
Fortune et al.

(10) Patent No.: US 7,944,859 B2
(45) Date of Patent: May 17, 2011

(54) NETWORK DESIGN METHOD

(75) Inventors: Steven Fortune, Bedminster, NJ (US); Gordon Thomas Wilfong, Bedminster, NJ (US); Zhengxue John Zhao, Marlboro, NJ (US); Mohamed El-Sayed, Tinton Falls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/398,203

(22) Filed: Mar. 5, 2009

(65) Prior Publication Data
US 2010/0226285 A1 Sep. 9, 2010

(51) Int. Cl.
*H04L 12/28* (2006.01)

(52) U.S. Cl. ........................................ 370/256

(58) Field of Classification Search .................. 370/256, 370/238, 221
See application file for complete search history.

(56) References Cited

U.S. PATENT DOCUMENTS

| | | | | |
|---|---|---|---|---|
| 5,381,404 A * | 1/1995 | Sugano et al. | ................ | 370/238 |
| 6,400,681 B1 * | 6/2002 | Bertin et al. | ................ | 370/218 |
| 6,801,496 B1 * | 10/2004 | Saleh et al. | ................ | 370/221 |
| 6,801,506 B1 * | 10/2004 | Dey | .............................. | 370/256 |
| 7,075,892 B2 * | 7/2006 | Grover et al. | ................ | 370/238 |
| 7,362,709 B1 * | 4/2008 | Hui et al. | ...................... | 370/237 |
| 7,760,668 B1 * | 7/2010 | Zinjuvadia | .................... | 370/256 |
| 2003/0093691 A1 * | 5/2003 | Simon et al. | .................. | 713/201 |
| 2005/0228852 A1 * | 10/2005 | Santos et al. | .................. | 709/200 |

* cited by examiner

Primary Examiner — Thong H Vu
(74) Attorney, Agent, or Firm — Brosemer, Kolefas & Associates

(57) ABSTRACT

A network design method for Ethernet-type networks exhibiting capacities sufficient for operation during normal periods as well those as periods when a single node or link has failed.

3 Claims, 2 Drawing Sheets

NETWORK DESIGN METHOD

FIELD OF THE INVENTION

This invention relates generally to the field of network design and in particular to a design method resulting in networks that are both resilient and fault-tolerant.

BACKGROUND OF THE INVENTION

Spanning Tree Protocol(s) (STPs) and spanning trees are conventionally employed by network designers to determine routing and/or forwarding in contemporary Ethernet-type networks. When a node or link within the network fails, a new spanning tree is determined and traffic is rerouted such that it avoids the failed node or link.

SUMMARY OF THE INVENTION

An advance is made in the art according to the principles of the invention directed to a network design method which produces Ethernet-type networks exhibiting sufficient capacity during periods of normal operation as well as periods when a single node or link has failed. According to an aspect of the present invention, an input to the method will comprise a network design and a collection of new demands and an output of the method will be a set of parameters that will define a new network design.

More particularly, and as used herein, a network is characterized by a graph wherein the nodes and links exhibit various attributes. In particular, a network N comprises a unidirected graph $G=(V,E)$ and a number of other parameters. For each node $v \in V$, the $cost_v( )$ is defined as a function which—for example—$cost_v(b)$ is the cost of provisioning v to have capacity sufficient to handle a node load of b Similarly, for each link $e \in V$, $cost_e( )$ is a function where $cost_e(b)$ is the cost of provisioning e to have a capacity sufficient to handle a link load of b. Finally, for each link $e \in V$, there is a link delay given by $\delta_e$.

According to an aspect of the present invention, we let $V=\{v_1,v_2, \ldots ,v_n\}$ and $E=\{e_1,e_2, \ldots ,e_m\}$, wherein t is the number of MSTIs in the desired design. As such, a network design N will comprise: a network N; capacities C(v) for each $v \in V$; capacities C(e) for each $e \in E$; and for each i, $1 \leq i \leq t$; (that is for each MSTI)—a set of demands $D_i$, a priority function $p_i(x)$ defined for $x \in E \cup V$, and a length function $L_i(e)$ defined for $e \in E$, which we write notationally as:

$P=(p_1( ),p_2( ), \ldots ,p_t( ))$;

$L=(L_1( ),L_2( ), \ldots ,L_t( ))$;

$C=(C(v_1), \ldots ,C(v_n),C(e_1), \ldots ,C(e_m))$; and $D=(D_1,D_2, \ldots ,D_t)$; such that $\mathbb{N}=(N,D,P,L,C)$.

According to an aspect of the present invention, an input to the method will comprise a network design $\mathbb{N}=(N,D,P,L,C)$ and a collection of new demands $\hat{D}=(\hat{D}_1, \hat{D}_2, \ldots ,\hat{D}_t)$.

The output of the method will be a set of parameters that will define a new network design $\mathbb{N}'=(N,D',P',L',C')$, where $D'=(D_1'=D_1 \cup \hat{D}_1, D_2 \cup \hat{D}_2, \ldots ,D_t \cup \hat{D}_t)$, $P'=(p_1'( ),p_2'( ), \ldots p_t'( ))$, $L'=(L_1'( ),L_2'( ), \ldots L_t'( ))$, and $C'=(C'(v_1), \ldots C'(v_n),C'(e_1), \ldots C'(e_m))$.

which advantageously survives a single node or link failure.

BRIEF DESCRIPTION OF THE DRAWING

These and other aspects of the invention will be apparent to those skilled in the art in view of the following detailed description along with the drawing figures in which.

DETAILED DESCRIPTION

Figure 1:
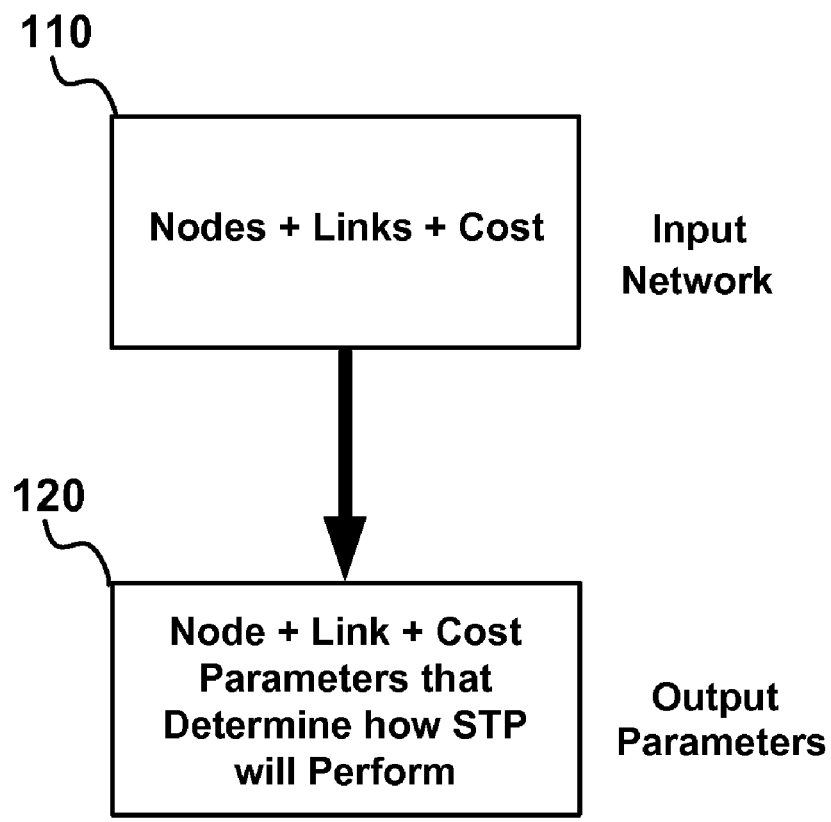
FIG. 1 is a flow diagram depicting a network design according to an aspect of the present invention.

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

By way of some additional background, we begin by noting that when performing a network design method according to an aspect of the present invention, a network operator may provide as input a set of locations (nodes) as well as identification of which one(s) of the nodes are interconnected. For our purposes herein, the term network generally means a representation of those nodes along with their connectivity (i.e., links).

As noted earlier, our inventive method takes as input a representation of a network and its demands and returns a set of node and link parameters that determine how the Spanning Tree Protocol will perform. More particularly, for each Multiple Spanning Tree Instance (MSTI) the node and link parameters determine a sub-tree of the network that the Spanning Tree Protocols will construct as well as any additional sub-trees that the Spanning Tree Protocols will construct upon the failure of any given node or link. Finally, our method produces indications of the required capacities for the nodes and links such that it is possible to forward the demands according to any of these sub-trees.

With this background in place, and as can now be readily understood by those skilled in the art, when given an undirected graph $G=(V,E)$, a bridge priority $p(v) \forall v \in V$, a link priority p(e), and a link cost L(e) for each link $e \in E$, the Spanning Tree Protocol computes a shortest path spanning tree denoted as $STP(G,p( ),L( ))$. As used herein—and in order to avoid confusion—we refer to the link cost L(e) for each link as the length of e to distinguish it from the cost of provisioning capacity in the network.

Importantly, each link e={u,v} has two oppositely directed links e1=(u,v) and e2=(v,u) associated with it. As a result, specifying the priorities and lengths completely determines the tree that the STP will compute as well as the tree that the STP will compute in the event of a given link or node failure.

Each demand $d=(s_d, t_d, b_d, p_d)$ is a directed demand that represents a requirement of forward traffic of bandwidth $b_d$ from source node $s_d$ to terminal node $t_d$. A demand d originates at $s_d$ and terminates at $t_d$ and $p_d$ is to indicate whether or not a demand is a protected demand.

For a given forwarding F of demands, the node load of node v is denoted by $b_F(v)$ and it represents the total bandwidth of all demands originating, terminating or transiting v in F. The link load of a link e is denoted by $b_F(e)$ and it represents the maximum of the total bandwidth of all demands forwarded over e1 (i.e., along e in the direction defined by e1) and the total bandwidth of all demands forwarded over e2 in F.

Initially, we may think of the present method as taking as input some network and demands and returning priorities, lengths and capacities such that the capacities returned are sufficient to handle traffic on links and nodes as determined by the priorities and the lengths. Operationally however, we may prefer a more general view as in the case where the network may already have some capacities, priorities and lengths specified for a set of demands and now new demands are to be incorporated into the design such that the initial capacities, priorities and lengths may be adjusted. Similarly, an "empty" or "Greenfield" network design which has no pre-defined capacities, priorities or lengths as well as a network design that has some capacity at some nodes and/or links but may not necessarily be sufficient capacity may advantageously serve as a valid network inputs to the method of the present invention.

As noted, a network is characterized by a graph wherein the nodes and links exhibit various attributes. In particular, a network N comprises a unidirected graph G=(V,E) and a number of other parameters. More particularly, for each node $v \in V$, the $cost_v( )$ is defined as a function which—for example—$cost_v(b)$ is the cost of provisioning v to have capacity sufficient to handle a node load of b Similarly, for each link $e \in V$, $cost_e( )$ is a function where $cost_e(b)$ is the cost of provisioning e to have a capacity sufficient to handle a link load of b. Finally, for each link $e \in V$, there is a link delay given by $\delta_e$.

With these definitions in place, if we let $V=\{v_1, v_2, \ldots, v_n\}$ and $E=\{e_1, e_2, \ldots, e_m\}$, and wherein t is the number of MSTIs in the desired design, a network design $\mathbb{N}$ will comprise: a network N; capacities C(v) for each $v \in V$; capacities C(e) for each $e \in E$; and for each i, $1 \leq i \leq t$; (that is for each MSTI)—a set of demands $D_i$, a priority function $p_i(x)$ defined for $x \in E \cup V$, and a length function $L_i(e)$ defined for $e \in E$. Notationally we write $$P=(p_1( ), p_2( ), \ldots, p_t( ));$$

$$L=(L_1( ), L_2( ), \ldots, L_t( ));$$

$$C=(C(v_1), \ldots, C(v_n), C(e_1), \ldots, C(e_m)); \text{ and}$$

$$D=(D_1, D_2, \ldots, D_t); \text{ such that}$$

$$\mathbb{N}=(N, D, P, L, C).$$

Accordingly an input to our inventive method will comprise a network design $\mathbb{N}=(N,D,P,L,C)$ and a collection of new demands $\hat{D}=(\hat{D}_1, \hat{D}_2, \ldots, \hat{D}_t)$. Note that the "Greenfield Design" described above is simply a special case of a general "growth design" described above where $p_i( )$ and $L_i( )$ are undefined, $D_i=0$, and $C(x)=0$, for $1 \leq i \leq t$ and $x \in E \cup V$.

The output of our inventive method will be a new network design $\mathbb{N}'=(N, D', P', L', C')$ where $$D'=(D_1'=D_1 \cup \hat{D}_1, D_2 \cup \hat{D}_2, \ldots, D_t \cup \hat{D}_t),$$

$$P'=(p_1'( ), p_2'( ), \ldots, p_t'( )),$$

$$L'=(L_1'( ), L_2'( ), \ldots, L_t'( )), \text{ and}$$

$$C'=(C'(v_1), \ldots C'(v_n), C'(e_1), \ldots C'(e_m)).$$

Notice that the network N remains unchanged as it is just a description of a network's connectivity, link delays and cost functions.

Preferably—and as already noted—the output of our inventive method namely the new network design, should satisfy a number of constraints. First, there must be sufficient capacity assigned to nodes and links such that the output network design will handle traffic in normal situations (all nodes/links operating) and in those situations in which a single node or link has failed. We may now define this constraint.

To begin, for $x \in E \cup V$, we let $G-\{x\}$ be a graph obtained by removing a single node x from G. Of course, and as can be quickly appreciated by those skilled in the art, once a node is removed, then so too are all of the links adjacent to that node.

Consider a network design $\mathbb{N}=(N,D,P,L,C)$. Let $P_i \subset D_i$ be a set of protected demands in $D_i$, where $1 \leq i \leq t$. For $v \in V$, and any $P_i$, we let $P_i(v)$ be those protected demands in $D_i$ that do not have v as an endpoint.

Let F represent the forwarding of demands where all of the demands in $D_i$ are forwarded in $STP(G, p_i( ), L_i( ))$, where $1 \leq i \leq t$. For $v \in V$, we let F(v) be the forwarding of demands where all demands in $P_i(v)$, i.e., the protected demands not originating or terminating at v, are forwarded in $STP(G-\{v\}, p_i( ), L_i( ))$, where $1 \leq i \leq t$.

Similarly, for $e \in E$, we let F(e) be the forwarding of demands where all demands in $P_i$ (the protected demands) are forwarded in $STP(G-\{e\}, p_i( ), L_i( ))$, where $1 \leq i \leq t$. If, for all $x \in E \cup V$, $v \in V$ and $e \in E$, we have that $b_F(v) \leq C(v)$, $b_{F(e)} \leq C(e)$, $b_{F(x)}(v) \leq C(v)$, and $b_{F(x)}(e) \leq C(e)$, then we may say that $\mathbb{N}$ is a valid network design. As can now be appreciated, and according to an aspect of the present invention, we require that all output network designs be valid network designs.

As can be readily appreciated, there are a number of situations in which it is desirable to impose Quality-Of-Service (QOS) constraints on the output network design. Advantageously, such impositions are accommodated with the network design method according to the present invention.

It may be desirable that the network design satisfy a constraint—for example—whereby the demands in $D_i'$ are forwarded according to $STP(G, p_i'( ), L_i'( ))$, then no demand is forwarded over more than $h_i$ links where $1 \leq i \leq t$. A network design that satisfies this exemplary constraint is said to be hop count compliant.

Similarly, it may be desirable that the network design satisfies the constraint that if the demands in $D_i'$ are forwarded according to $STP(G, p_i'( ), L_i'( ))$, then the total delay along any path over which a demand is forwarded is not greater than $\Delta_i$, where $1 \leq i \leq t$. A network design that satisfies this exemplary constraint is said to be delay compliant.

Of course those skilled in the art will readily appreciate that any of a number of additional constraints may be imposed upon a network design $\mathbb{N}'$. For example, a min-cost design (minimum cost design) imposes the constraint that the total cost of provisioning new capacity is minimized. Such minimum cost designs may have additional constraints as well. More particularly, if the set of endpoints of new demands (the demands in D̂) is contained in the set of endpoints of the original demands (the demands in D) then it may be required that the only difference between N and N' are the capacities. That is to say, N'=(P,L,C') where C(x)≦C'(x), for x ϵ E ∪ V. Stated alternatively, all forwarding remains the same but additional capacity may be required in order to produce a valid network design. Such designs are called fixed tree designs and sometimes described as "link capacitation without adding new nodes."

Another type of design which imposes particular constraints is that which a bound c≧0 is given and the output network design will minimize the maximum link utilization where the total cost of additional capacity cannot be more than c. Such a design is called a min-max design.

Generally, a min-max design is one sometimes described as a "minimize maximum link utilization with a given cost budget for limited capacity change". In the specific instance where c=0, this is the design scenario also described as "basic load balancing."

Additionally, one could also be given a bound u and required to minimize the cost of adding capacities so as to achieve a network design having a maximum link utilization that is no more than u. Such a network is known in the art as a bounded utilization design.

Finally, it is worth noting that any of the min-max, bounded utilization, augmented tree, fixed tree, or min-cost designs described above may be further constrained by hop-count constraints or delay constraints as well.

As may now be appreciated, from the network design so produced i.e., N'=(P',L',C'), a number of other derivable quantities are realizable. For example, given P' and L', each primary tree $T_i$=STP(G,$p_i$'( ),$L_i$'( )) may be computed by running the Spanning Tree Protocol algorithm with the given priorities and lengths (costs). Also, for each node v failure, each resulting backup tree namely $B_i$(v)=STP(G−{v},$p_i$'( ),$L_i$'( )) may be determined once again by running STP with the node v removed from G. Similarly, for any link e, when e fails the resulting backup trees $B_i$(e)=STP(G−{e}, $p_i$'( ),$L_i$'( )) may likewise be determined by running STP.

We may now understand the operational aspects of our inventive method. In particular, and as shown in a flow chart of FIG. 1, when given a network of nodes and links along with their costs and traffic demands between the nodes 110, our inventive method produces the set of parameters (i.e., Ethernet parameters) and any required provisioning of the nodes and links such that any resulting network exhibits sufficient capacity during periods of normal operation as well as any periods when a single node or link fails 120. As those skilled in the art will readily appreciate, the set of parameters (Ethernet parameters) are a set of node priorities, port priorities and link weights that the Spanning Tree Protocol uses to determine forwarding paths for demands in a network.

In a representative operation, the STP will set the node having the best (highest) node priority as the root r of a tree and then uses link weights to determine a shortest path tree T rooted at r. In the event of a tie, port priorities may be used to resolve same.

Each demand d is forwarded according to a unique path in T between the endpoints of d. When a node or link fails, STP runs again with the remaining network (non-failed portion) and computes a backup tree on which to forward the demands. Consequently, and as can be appreciated by those skilled in the art, the set of parameters produced by our inventive method fully determines the routing of the demands in all network conditions and hence the maximum load on any link or node over normal and single node/link failure. More specifically, the parameters determine the size (and therefore cost) of the provisioning necessary for each node and link to ensure sufficient capacity in both the normal and single-failure conditions.

Figure 2:
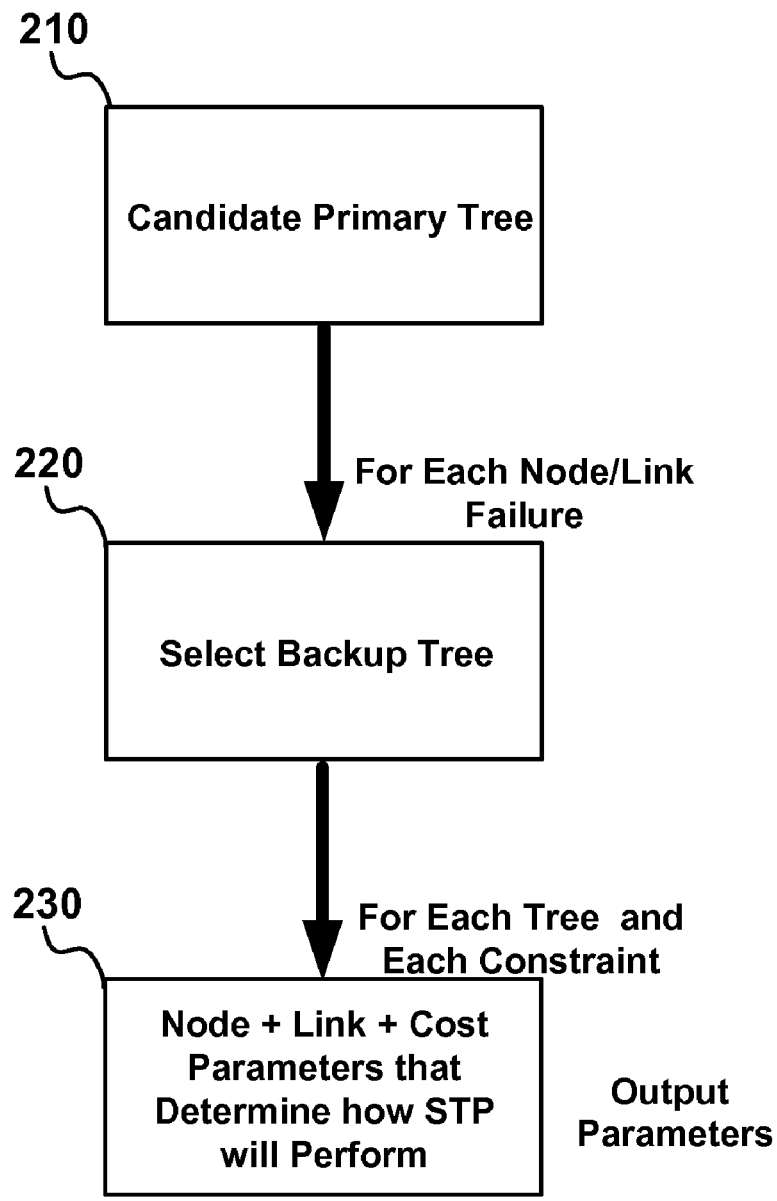
FIG. 2 is a flow diagram depicting an aspect of network design according to the present invention.

Turning now to FIG. 2, there is shown a flowchart depicting a central routine of our inventive method. In particular, a candidate primary tree T, for example the tree on which demands will be routed in normal operating situations) is input 210. For each node and link failure in T a backup tree is selected by, for example, a heuristic methodology based upon estimated loads 220.

For the set of trees so selected a set of parameters is determined which produce each one of the trees in the set for each of a given set of network conditions 230. As can be appreciated, it may not always be possible to determine the exact set of parameters which produces a given tree however, tree selections may be judiciously made to influence the possible set of parameters. For example, the link weights may be set such that those in the primary tree T are very small, while those in the backup tree are larger and none in any of the selected trees are set so large that STP would never choose them in a shortest path tree.

After the parameters have been determined, the load on each link and each node is determined for each network condition and then provisioned to the maximum of each determined load. As can be appreciated, this ensures that if the determined network parameters are used to design the network, then the network so designed will be sufficiently provisioned for both normal conditions and those conditions in which a single node or link has failed. Such methodology may be conveniently thought of as determining the cost of provisioning the network taking T as a candidate primary tree.

Advantageously, if a goal of a network design is to produce a favorable cost, then our inventive method will produce a number of candidate primary trees and then perform the above-described procedure to determine their costs and select the one which has such desirable cost. In many cases, that may be the minimum cost. As before, the output is a set of Ethernet (network) parameters and any required provisioning of the links and nodes.

In a preferred embodiment, an initial candidate primary tree is selected based on—for example—heuristics for estimating the minimum cost spanning tree. The backup trees are then evaluated as potential primary trees and the link backup trees for these backup trees in turn may be used as potential primary trees—and so on. Of course, any constraints such as hop count may be imposed by rejecting any primary tree candidates that fail a particular constraint. In such cases, a depth first search trees may also be used as potential primary trees. In those cases where link delays are given and a bound on total delay on demand routes is known and imposed, shortest path trees may advantageously be used as candidates where the link weights used are the link delays.

Alternatively, for those designs which are constrained such that no link is utilized more than some given upper bound, then demand sizes may be appropriately increased. The above described procedure may then be used to find a minimum cost design.

Finally, for a case where link utilization is necessarily minimized, a minimum cost design is first determined as above and then a maximum link utilization is determined for that design. Then—using a binary search-like procedure, for various bounds a network design is determined without any additional provisioning while maintaining the fixed utilization requirement (by for example, expanding the size of demands).

At this point, while we have discussed and described the invention using some specific examples, those skilled in the art will recognize that our teachings are not so limited. For example, once the primary and backup trees have been determined as described, further details such as determining all demands forwarded over a given link or through a given node in any of the trees may be determined since a unique path for each demand within a tree may be found. Thus it is possible to determine the resulting node and link loads in each such tree. Of additional interest, given the capacities C' and link loads as described, the link utilities can be determined. Additionally, given the input capacities C and the output capacities C' it is possible to determine any additional capacity added at each node and link. As a result, the present method permits the determination of the total cost of any additional capacity. Accordingly, the invention should be only limited by the scope of the claims attached hereto.

What is claimed is:

1. A computer implemented network design method comprising the steps of:
    inputting to the computer a representation of a network; and
    outputting by the computer a set of node and link parameters indicative of how a Spanning Tree Protocol (STP) will perform upon the failure of any given node or link in the network;
    determining for each Multiple Spanning Tree Instance (MSTI) the node and link parameters indicative of how the STP will perform;
    inputting the representation of the network wherein said representation describes the networks connectivity, link delays and cost functions;
    wherein the input network is defined by N=(N,D,P,L,C) where N is the network, C is a set of capacities; D is a set of demands; P is a priority function; and L is a length function; and
    wherein the output set of parameters defines a network which is hop-count compliant.

2. The method of claim 1, wherein the output set of parameters defines a network which is delay compliant.

3. A network design method comprising the steps of: inputting a representation of a network N=(N,D,P,L,C) where N is the network, C is a set of capacities; D is a set of demands; P is a priority function; and L is a length function; and outputting a set of node and link parameters indicative of how a Spanning Tree Protocol (STP) will perform upon the failure of any given node or link in the network; wherein the set of node and link parameters are used to define an output network,
    N'=(N,D',P',L',C') where
    D'=(D'$_1$=D$_1$.orgate.{circumflex over (D)}$_1$,D$_2$.orgate.{circumflex over (D)}$_2$, ..., D$_t$.orgate.{circumflex over (D)}$_t$),
    P'=(p'$_1$( ),p'$_2$( ), ... p'$_t$( )),
    L'=(L'$_1$( ),L'$_2$( ), ... L'$_t$( )), and
    C'=(C'(v$_1$), ... C'(v$_n$),C'(e$_1$), ... C'(e$_m$))
    wherein the output set of parameters defines a network which is hop-count compliant.

* * * * *